United States Patent [19]

Woodmansee et al.

[11] Patent Number: 5,227,598
[45] Date of Patent: Jul. 13, 1993

[54] IN PLACE REGENERATION OF ADSORBENTS USING MICROWAVES

[75] Inventors: Donald E. Woodmansee, Schenectady; James J. Carroll, Sr., Ballston Lake, both of N.Y.

[73] Assignee: General Electric Company, Schenectady, N.Y.

[21] Appl. No.: 811,637

[22] Filed: Dec. 23, 1991

[51] Int. Cl.⁵ .............................................. H05B 6/80
[52] U.S. Cl. ..................... 219/10.55 R; 219/10.55 A; 219/10.55 F
[58] Field of Search ................. 219/10.55 R, 10.55 F, 219/10.55 M, 10.55 A; 423/460; 34/1, 4; 502/20, 21, 22

[56] References Cited

U.S. PATENT DOCUMENTS

| | | | |
|---|---|---|---|
| 4,208,806 | 6/1980 | Manser et al. | 34/1 |
| 4,322,394 | 3/1982 | Mezey et al. | 423/244 |
| 4,370,534 | 1/1983 | Brandon | 219/10.55 A |
| 4,400,604 | 8/1983 | Ohtsuka et al. | 219/10.55 M |
| 4,406,937 | 9/1983 | Soulier | 219/10.55 A |
| 4,737,610 | 4/1988 | Kotsch et al. | 219/10.55 M |

Primary Examiner—Bruce A. Reynolds
Assistant Examiner—Tuan Vinh To
Attorney, Agent, or Firm—Patrick R. Scanlon; Paul R. Webb, II

[57] ABSTRACT

Apparatus for selectively regenerating at least one portion of an adsorbent bed in an adsorption system with a movable microwave device while the remainder of the bed is still being used. The adsorbent bed is held by a frame which divides the bed into a plurality of sections, each section holding a portion of the adsorbent. At least one movable regeneration carriage assembly which moves from section to section is provided. The carriage assembly supports a microwave heating device which heats the adsorbent in the section adjacent to the carriage assembly. Each section can be isolated from the others in turn and be regenerated while the remaining sections continue the adsorption function. The isolated section is swept by a purge gas which is conveyed to and from the section by flexible cords connected to the carriage assembly.

18 Claims, 4 Drawing Sheets

IN PLACE REGENERATION OF ADSORBENTS USING MICROWAVES

BACKGROUND OF THE

This invention relates generally to in place regeneration of an adsorbent such as activated carbon using microwave energy and more particularly concerns microwave regeneration of a portion of a carbon bed while the rest of the bed is still actively online.

In industry, process streams carrying contaminants or other components are often purified by passing the stream in contact with an adsorbent. The contaminants or other components are adsorbed by the adsorbent, thereby removing them from the process stream. Adsorption is most effective when the adsorbent is maintained at ambient temperatures or cooler. The adsorbed materials are referred to as adsorbates or simply sorbates. Thus, a sorbated adsorbent refers to an adsorbent having adsorbed materials therein. In the course of cleansing process streams, the adsorbent will eventually become saturated with sorbates and be unable to adsorb further materials. Rather than simply being disposed of, a saturated adsorbent can be recycled through a process which desorbs or strips the sorbates from the adsorbent. Once the sorbates have been desorbed, the adsorbent is again capable of being used to cleanse process streams.

Such processes are generally referred to as regeneration because they regenerate or renew the adsorbing capacity of the treated adsorbent. In the case where the adsorbent is activated carbon, a distinction is made sometimes where low temperature processes (i.e., in the range of 200°–400° F.) are referred to as regeneration and higher temperature processes (up to 1800° F.) are referred to as reactivation. However, for the sake of clarity, the term "regeneration" as used herein, will include both low and high temperature desorbing processes. It is desirable to employ a regeneration process which is capable of stripping the sorbates on the plant site, because such a process eliminates the need to ship the sorbated carbon off site for cleaning. Besides offering cost advantages, on site regeneration reduces the number of plant emissions which must be reported to the Environmental Protection Agency.

A typical method of regenerating a saturated adsorbent is to heat the adsorbent with a flow of hot gas such as steam, nitrogen or flue gases to a sufficiently high temperature at which the sorbate will be desorbed. The high temperature causes the sorbated matter to vaporize and pass from the adsorbent. The flow of the hot gas also purges the vaporized or desorbed materials from the system. The adsorbent bed must be taken offline to be swept with the hot gas. Some disadvantages of this gas heating method include long regeneration times, large amounts of purge gas, nonuniform heating of the adsorbent material, dilution of the sorbate vapors with heating gases, and generation of sorbate condensates diluted by a large fractions of water if steam is used as the heating gas. Furthermore, the gas heating method requires heating not only the adsorbent material but also the entire structure containing the adsorbent, which is necessarily several times heavier than the adsorbent. Thus, the design of the containment structure is controlled by the temperature and corrosion limits prescribed the the regeneration process.

Microwave heating of the adsorbents has been proposed to avoid some of the problems associated with the hot gas heating method. Microwave heating has an advantage in that the adsorbent material alone can be heated without directly heating the containment structure. By heating only the adsorbent, the energy required for regeneration is reduced. The cost of the containment structure can also be reduced since the structure is subjected to lower temperature ranges. Microwave heating also can produce generally higher regeneration temperatures than the gas heating method; for example, steam regeneration is usually limited to about 250° F.

A simple approach to microwave heating is to transfer the adsorbent from the adsorber vessel to a bulk container and expose the container to microwave energy in order to heat the adsorbent to the regeneration temperature. However, this approach is still inefficient and time consuming, because it is a non-continuous or batch operation, wherein the adsorbent bed is not only taken offline but removed from the adsorber vessel for transfer to the bulk container. Besides creating excessive downtime and transfer expense, the required handling of the adsorbent material can result in heavy attrition losses. Handling the adsorbent is made even more difficult when treating adsorbent containing water, dirt and/or other solids due to agglomeration of adsorbent granules.

SUMMARY OF THE INVENTION

Accordingly, it is an object of the present invention to provide an adsorber system in which an adsorbent bed can be regenerated in the adsorber vessel using microwave heating.

More specifically, it is an object of the present invention to selectively regenerate at least one portion of an adsorbent bed in an adsorption system with a movable microwave device while the remainder of the bed is still being used.

In addition, it is an object of the present invention to provide a system for regenerating adsorbent material without requiring movement of the adsorbent, thereby reducing attrition losses.

It is yet another object of the present invention to provide a system for regenerating adsorbent material that does not require large volumes of hot gas.

These and other objects are accomplished in the present invention by providing an adsorber system for treating a process stream having a frame which holds a bed of adsorbent material. The frame is divided into a plurality of sections through which the gases of the process stream pass in parallel. Each section holds a portion of the adsorbent material. At least one movable regeneration carriage assembly is provided which comprises an upper carriage including a platform arranged to move relative to the frame and a shroud carried by the platform and dimensioned to cover the upper surface of any one of said plurality of sections and a lower carriage including a platform arranged to move relative to the frame and a shroud carried by the platform and dimensioned to cover the lower surface of any one of the plurality of sections. Each of the upper and lower carriages includes at least one actuator for displacing the shroud relative to the corresponding platform. The lower and upper carriages are moved in unison by a drive means which selectively positions the carriage assembly adjacent to any one of said plurality of sections. A microwave heating device is mounted to the carriage assembly for heating the adsorbent in the selected section. A first flexible cord connects the upper carriage with the exterior of the adsorber system and a second flexible cord connects the lower carriage with the exterior of the adsorber system. These cords provide a means for admitting purge gas and removing eluted sorbate gases as well as providing power to the microwave heating device and inlet and outlet means for cooling water.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
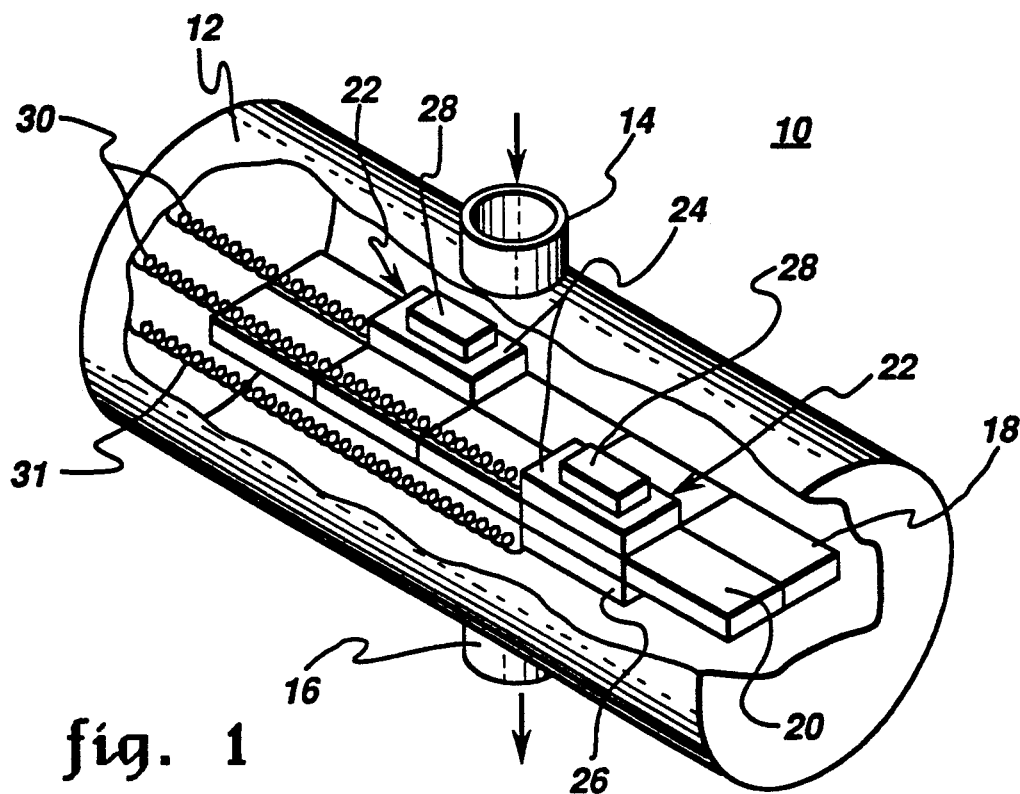
FIG. 1 is a partially cut away perspective view of the present invention.

Turning to FIG. 1, an adsorber system 10 in which the present invention is incorporated is shown. The adsorber 10 comprises a cylindrically-shaped containment vessel 12 which encloses the entire system. An inlet 14 and an outlet 16 are provided in the containment vessel 12 to permit a process stream to flow through the adsorber 10 as shown by the arrows.

A frame 18 is disposed within the containment vessel 12 and holds adsorbent material in order to provide an adsorbent bed for treating the process stream. The frame 18 is situated in the middle of the vessel interior and extends substantially the entire length and breadth of the vessel 12. This positioning of the frame requires the flow entering the inlet 14 to pass through the frame 18 and the adsorbent bed before exiting the vessel 12 via the outlet 16. The frame 18 is divided into a plurality of equally-sized sections 20, each section holding a portion of the adsorbent bed. As seen in the Figure, there are two rows of five sections for a total of ten sections. However, the present invention is not limited to this configuration as any number of arrangements could be utilized as long as a plurality of sections is provided.

Figure 2:
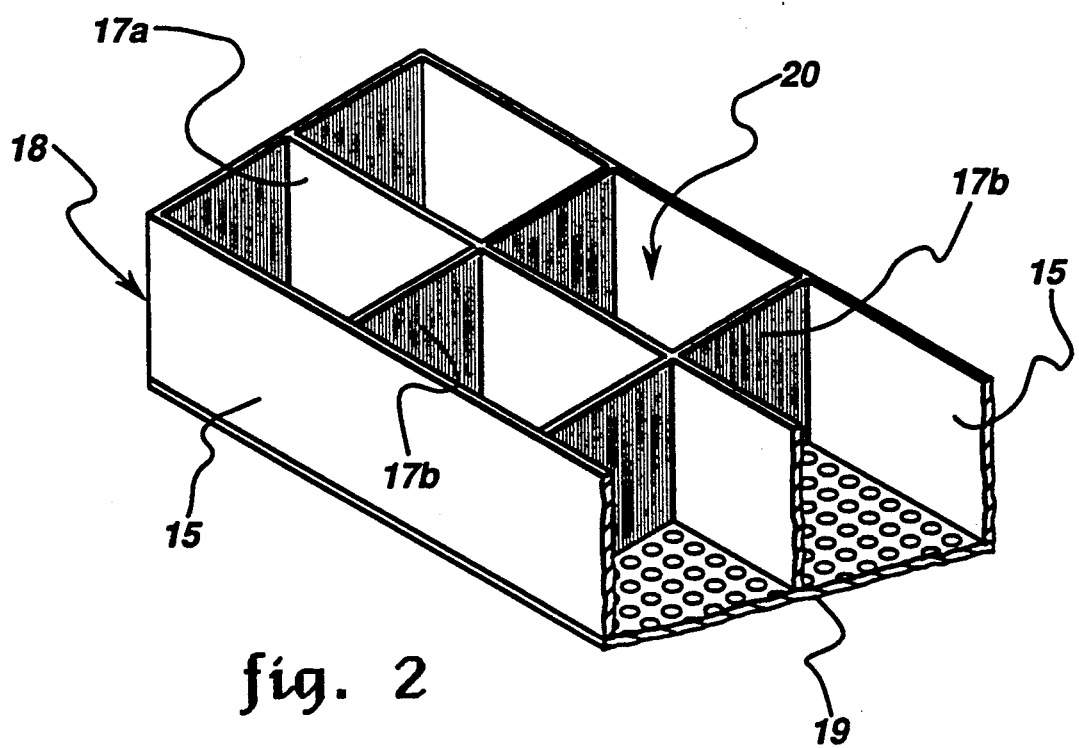
FIG. 2 is a partially cut away perspective view of the adsorbent holding frame of the present invention.

FIG. 2 shows a partially cut away isometric view of the frame 18. The frame comprises a rectangular outer shell 15 and a number of intersecting separators or dividing members 17 which partition the frame 18 into the sections 20. The dividing members comprise a longitudinal center member 17a and a number of transverse members 17b. The dividing members 17a, 17b are made of a ceramic material which provides gas impermeability as well as some thermal insulation between adjacent sections. Ordinary cast alumina with wire reinforcement is an acceptable material. The bottom of the frame 18 is provided with a perforated plate 19 which supports the adsorbent maintained in the frame while permitting gas to flow therethrough. The perforations of plate 19 must be small enough so that the adsorbent material does not sift through.

Referring back to FIG. 1, one or more regeneration carriage assemblies 22 are positioned in proximity to the frame 18. The carriage assemblies are movable with respect to the frame 18 and can be selectively aligned with any one of the sections 20, thereby isolating the selected section from the others. Each section can be isolated in turn while the remaining sections continue to adsorb contaminants from the process stream being cleaned.

Each regeneration carriage assembly 22 comprises an upper carriage 24 disposed above the frame 18 and a lower carriage 26 disposed underneath the frame 18. The upper and lower carriages of each carriage assembly 22 are moved in unison by a drive mechanism (not shown in FIG. 1). The upper and lower carriages are sized to coincide with the upper and lower cross sectional dimensions, respectively, of the equally-sized sections 20. Thus, when aligned with a selected section, the upper and lower carriages enclose that section while leaving the remaining sections open. Although two carriage assemblies are shown in FIG. 1, the present invention can be implemented with any number of carriage assemblies, including only one. Generally, one carriage assembly 22 per row of sections 20 is sufficient.

The upper carriage 24 of each carriage assembly 22 carries a microwave heating device 28. For some applications, the lower carriage may also be provided with a microwave heating device. In which case, the plate 19 should be microwave transparent. The microwave heating device 28 subjects adsorbent material to electromagnetic radiation, thereby heating the adsorbent for regeneration. The device 28, which can be any one of the standard microwave devices known in the art, is arranged to heat substantially only the adsorbent in the section adjacent to the carriage assembly. For regeneration, the portion of sorbated adsorbent being treated is heated to a sufficient temperature at which all sorbates will be desorbed.

Although hot gas heating of the adsorbent could be used, microwave heating is preferred. Hot gas heating requires large heating and/or purge gas flows. Conveying large volumes of gas to and from a movable carriage assembly would be very difficult. Thus, microwave heating is preferred because the large gas flows associated with hot gas heating are not needed; only a small flow of purge gas is required. Furthermore, since adsorption should be conducted at low ambient temperatures for maximum effectiveness, the sections must be thermally insulated from one another. Because microwaves can be directed to a limited area, the amount of insulation required would be less extensive than that for hot gas heating. Also, the process stream would have to be well insulated from the hot gas flow; a feature not necessary when using microwave heating.

Each carriage assembly 22 is also provided with an upper umbilical cord 30 which connects the upper carriage 24 with the exterior of the containment vessel 12 and a lower umbilical cord 31 which connects the lower carriage 26 with the exterior of the containment vessel. The umbilical cords 30, 31 are coiled so as to stretch and contract with the carriage movement, thereby not to interfere with the movement of the carriage. The upper cord 30 provides a conduit for the ingress into the containment vessel 12 of a purge gas such as nitrogen, while the lower cord 31 provides egress from the containment vessel for the purge gas and any sorbates released from the heated bed portion. Both the upper and lower cords provide an inlet and an outlet of cooling water; the upper cord cooling water for cooling the structure of the microwave heating device 28 (the microwave heating device is also cooled by the relatively cool purge gas entering via the upper cord 30) while the lower cord cooling water cools the exiting sorbates and purge gas. The upper cord 30 also provides a means for inputting a source of electrical power to the microwave heating device 28.

Figure 3:
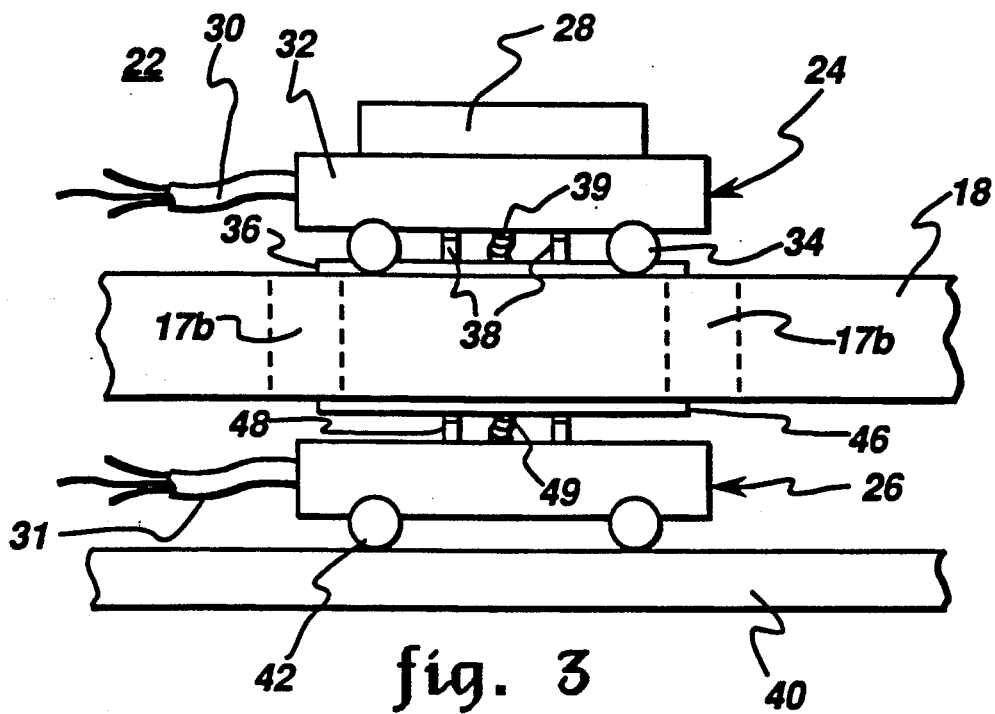
FIG. 3 is a side view of the regeneration carriage assembly of the present invention with the shrouds in the closed position.
Figure 4:
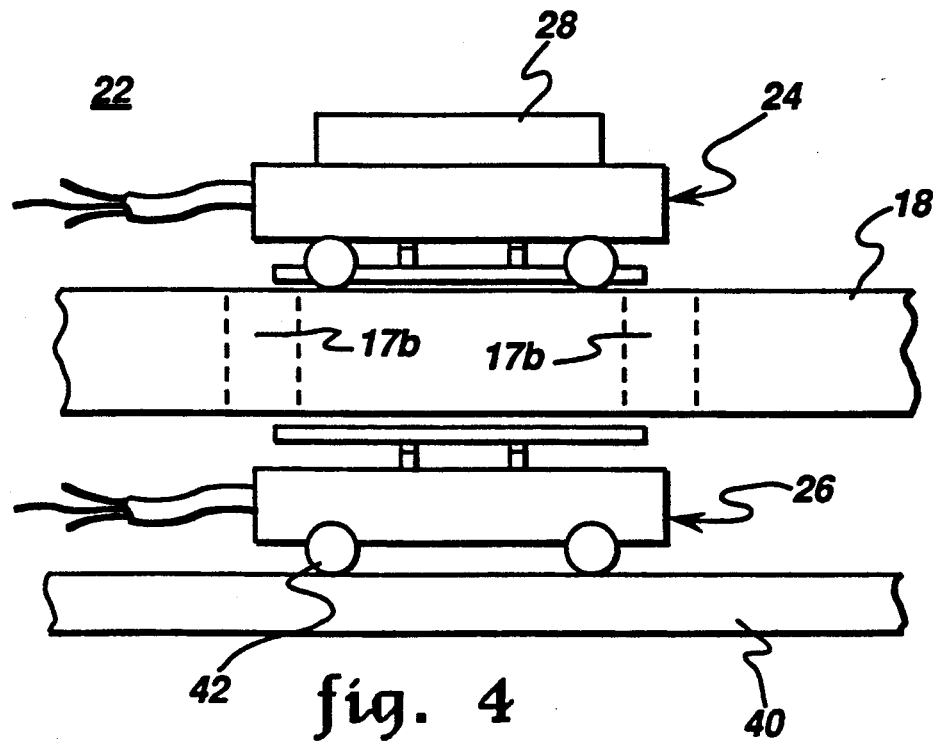
FIG. 4 is a side view of the regeneration carriage assembly of the present invention with the shrouds in the open position.
Figure 5:
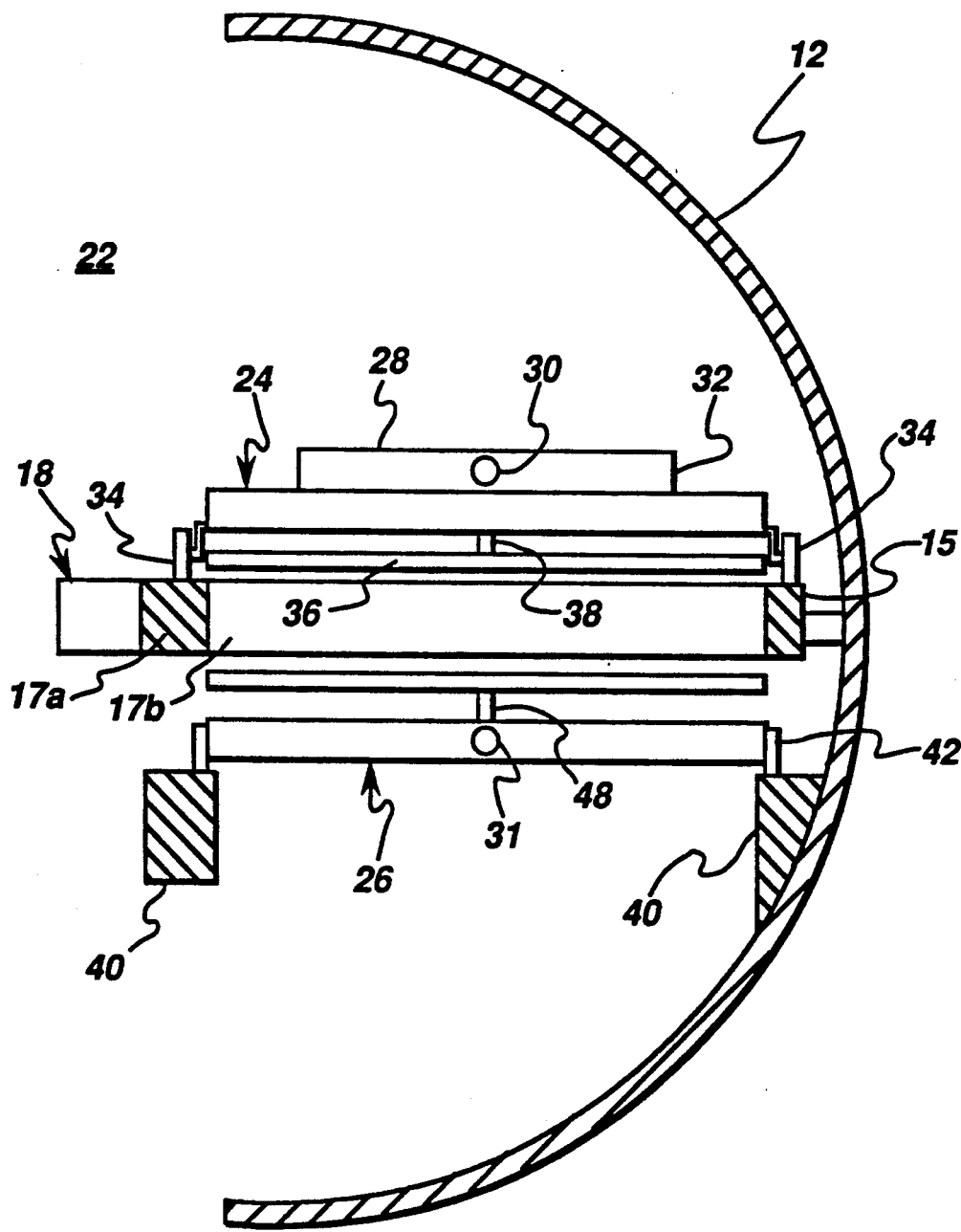
FIG. 5 is an end view of the regeneration carriage assembly of the present invention.

A regeneration carriage assembly 22 is shown in more detail in FIGS. 3-5, wherein FIGS. 3 and 4 are side views of the carriage assembly 22 and FIG. 5 is an end view. The upper carriage 24 comprises an upper platform 32 which is movably supported on the upper surface of the frame 18 by two sets of wheels 34 on either side of the platform. As seen in FIG. 5, the outer set of wheels 34 rides on the top surface of the outer shell 15 of frame 18 and the inner set of wheels 34 rides on the longitudinal center dividing member 17a. Thus, the upper carriage 24 is able to move back and forth along the row of sections shown on the right in FIG. 5.

A shroud 36 is suspended beneath the upper platform 32 by one or more actuating members 38. The actuating members 38 move the shroud 36 relative to the platform 32. The shroud 36 is vertically movable between one position in contact with the upper surface of the frame 18 (FIG. 3) and another position out of contact with the upper surface of the frame 18 (FIG. 4). The actuating members can be any type of drive mechanism such as a hydraulic cylinder or a mechanical linkage. The shroud 36 is a plate-like member having a gasket (not shown) attached to the bottom surface around its periphery. The shroud 36 is dimensioned to be slightly larger than the cross-sectional area of an adsorbent holding section 20, as viewed from above. Thus, when the actuating members 38 force the shroud 36 into engagement with the upper surface of the frame 18, the gasket forms a gas tight seal over the selected section.

The upper umbilical cord 30 is connected to the upper platform 32. The cord 30 comprises a number of separate tubes contained within an outer sheath. The upper platform has an internal chamber (not shown) which receives cooling water from a source outside of the containment vessel 12 via one tube of the upper umbilical cord 30. The chamber is positioned in the upper platform in order to provide cooling to the microwave heating device 28 which is mounted on the top of the platform 32 in a heat exchange relationship therewith. The warmed water is discharged through another tube of the cord 30. The upper platform 32 also has an internal conduit for passing purge gas received from an external source through yet another tube of the upper umbilical cord 30. A flexible tube 39 has one end connected to the internal conduit in the platform 32 and the other end extending through the upper shroud 36 for conducting purge gas into the selected section 20.

The lower carriage 26 is constructed similarly to the upper carriage. The lower carriage is movably supported on a series of carriage rails 40 situated within the containment vessel 12 below the frame 18 by four wheels 42. The lower carriage comprises an lower platform 44 to which the wheels 42 are connected. Another shroud 46 is carried above the lower platform 44 by one or more actuating members 48. As with the upper carriage, the actuating members 48 of the lower carriage 26 vertically move the shroud 46 relative to the platform 44, in (FIG. 3) and out (FIG. 4) of contact with the lower surface of the frame 18. The shroud 46 has a gasket (not shown) attached to its upper surface around its periphery for forming a gas tight seal when forced into engagement with the lower surface of the frame 18. Thus, when both shrouds 38 and 48 are forced into engagement with the frame 18 by the respective actuating members, the selected section is sealed and isolated from the rest of the system.

The lower umbilical cord 31 is connected to the lower platform 44. Like the upper cord 30, the lower cord 31 comprises a number of separate tubes contained by an outer sheath. A second flexible tube 49 is provided for providing fluid communication between the selected section 20 and an internal conduit in the lower platform 44. The flexible tube 49 has one end connected to the internal conduit in the platform 44 and the other end extending through the lower shroud 46. One of the tubes of the lower cord 31 is connected to the lower platform internal conduit for removing purge gas and any entrained sorbates from the containment vessel 12. The lower platform 44 has an internal chamber (not shown) which surrounds the internal conduit. Cooling water from an external source is introduced to the internal chamber via another tube in the lower umbilical cord 31. The coolant cools the exiting purge gas and sorbates. The warmed water is discharged through yet another tube of the cord 31.

Figure 6:
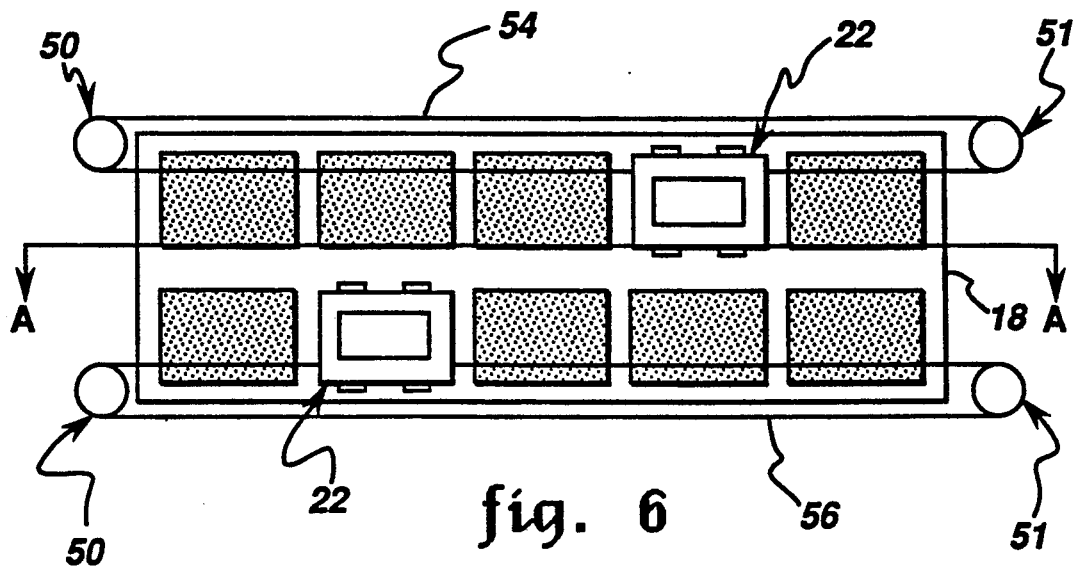
FIG. 6 is a partial top view of an adsorption system showing the carriage drive mechanism of the present invention.
Figure 7:
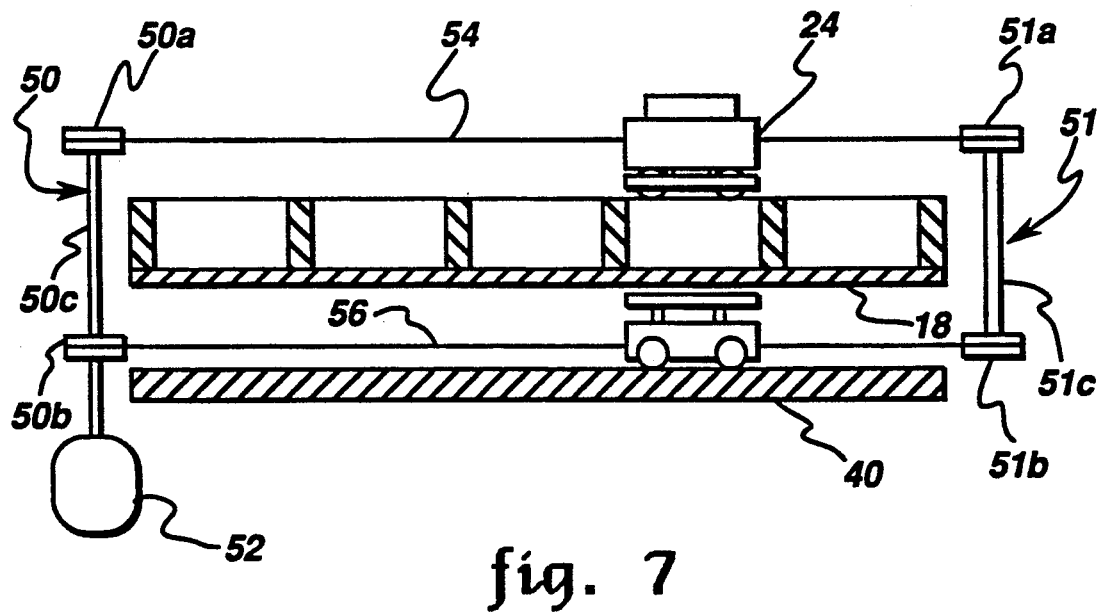
FIG. 7 is a partial side view of an adsorption system taken in cross section along line A—A of FIG. 6.

Turning to FIGS. 6 and 7, one preferred embodiment of a drive mechanism for moving the regeneration carriage assembly 22 is shown. Each drive mechanism comprises a first pulley assembly 50 disposed at one end of the frame 18 and a second pulley assembly 51 disposed at the other end of the frame. The first pulley assembly 50 has an upper pulley 50a and a lower pulley 50b attached to a common axle 50c; the second pulley assembly 51 has an upper pulley 51a and a lower pulley 51b attached to a common axle 51c. A drive motor 52 is connected to the axle 50c of the first pulley assembly 50 for turning the pulleys 50a, 50b in a clockwise or counter-clockwise direction. An upper cable 54 is looped around the two upper pulleys 50a, 51a and is connected at both ends to the upper carriage 24. A lower cable 56 is looped around the two lower pulleys 50b, 51b and is connected at both ends to the lower carriage 26. Thus, operation of the drive motor 52 effects synchronous movement of the upper and lower carriages 24, 26. The pulley-and-cable system described above is only one possible drive mechanism capable of being used with the present invention. Other mechanisms, such as a screw-and-nut assembly or an onboard traction motor drive, could also be employed.

In operation, the regeneration carriage assembly or assemblies 22 are are moved into position adjacent to the section or sections 20 selected for regeneration by the drive mechanism. Once the carriage assembly 22 is properly positioned, the upper and lower shrouds 36, 46 are forced against the frame 18 to isolate the selected section. Cooling water and purge gas flows are started and the microwave heating device is activated. The microwave energy heats the adsorbent in the selected section 20 to a temperature sufficient to desorb the contaminants or sorbates in the adsorbent. The sufficient temperature level is dependent on the boiling point of the sorbates and the affinity of the sorbates to the adsorbent. As the sorbates are desorbed, they are swept out through the lower carriage 26 and the lower umbilical cord 31 by the flow of purge gas. The purge gas enters through the upper umbilical cord 30 and then passes through the internal conduit of the upper platform 32, the flexible tube 39 of the upper carriage, the selected section 20 where released sorbates are entrained, the flexible tube 49 of the lower carriage, and the internal conduit of the lower platform 44. From there, the purge gas and sorbates are removed from the containment vessel 12 via the lower umbilical cord 31.

When the cycle is completed, the microwave heating device is deactivated and the adsorbent in the selected section allowed to cool. The flow of the cool purge gas may be increased to speed the cooling process. Once the adsorbent is sufficiently cooled, the flow of purge gas is discontinued and the shrouds 36, 46 are released and the regeneration carriage assembly 22 is moved to the next section 20 needing regeneration.

Service of the regeneration carriage assembly 22 and the microwave heating device 28 could be accomplished by retracting the assembly 22 into a compartment (not shown) at one end of the frame 18. A gas tight door would be provided to seal the service compartment from the rest of the containment vessel 12. In this way, both the carriage 22 and the microwave heating device 28 could serviced or stored while operation of the adsorber unit is continued.

The foregoing has described an apparatus which regenerates a selective portion of an adsorbent bed while the remaining portion of the bed remains online. The apparatus employs a carriage assembly with a microwave heating device which moves about the adsorbent bed regenerating one portion at a time.

While specific embodiments of the present invention have been described, it will be apparent to those skilled in the art that various modifications thereto can be made without departing from the spirit and scope of the invention as defined in the appended claims. One possible modification would be to provide a microwave heating device on the lower carriage as well as the upper carriage. Although presenting an additional cost, two microwave heating devices would heat the adsorbent material more uniformly. Another modification might be to heat the adsorbent electrically with AC or DC power instead of using microwaves.

What is claimed is:

1. An adsorber system for treating a process stream comprising:
   a containment vessel having means for passing a process stream therethrough;
   a frame for holding adsorbent material disposed within said vessel, said frame being divided into a plurality of adsorbent holding sections;
   a carriage assembly movably disposed in proximity to said frame;
   a microwave heating device mounted to said carriage assembly; and
   means for selectively positioning said carriage assembly adjacent to any one of said plurality of sections.

2. The system of claim 1 wherein said carriage assembly further comprises means for isolating the section adjacent to said carriage assembly from the process stream.

3. The system of claim 2 further comprising means for activating and deactivating said means for isolating.

4. The system of claim 2 further comprising means for passing a purge gas through the section adjacent to said carriage assembly.

5. The system of claim 1 wherein said carriage assembly comprises an upper carriage including a first platform arranged to move relative to said frame and a first shroud carried by said first platform and dimensioned to cover the upper surface of any one of said plurality of sections and a lower carriage including a second platform arranged to move relative to said frame and a second shroud carried by said second platform and dimensioned to cover the lower surface of any one of said plurality of sections.

6. The system of claim 5 wherein said upper carriage further includes at least one actuator for displacing said first shroud relative to said first platform and said lower carriage further includes at least one actuator for displacing said second shroud relative to said second platform.

7. The system of claim 6 further comprising a plurality of rails disposed within said vessel below said frame, wherein said first platform is movably supported on said frame and said second platform is movably supported on said rails.

8. The system of claim 5 further comprising means for passing a purge gas through the section adjacent to said carriage assembly.

9. The system of claim 8 wherein said means for passing a purge gas comprises a first cord connected to said upper carriage and having means for admitting purge gas and a second cord connected to said lower carriage and having means for removing purge gas and any entrained sorbates.

10. The system of claim 9 wherein said first cord further includes a means for supplying power to said microwave heating device.

11. The system of claim 5 wherein said means for selectively positioning said carriage assembly comprises a drive means for synchronously moving said upper and lower carriages.

12. The system of claim 1 wherein said sections are divided by gas impermeable and heat insulating members.

13. The system of claim 1 further comprising at least one other carriage assembly movably disposed in proximity to said frame.

14. In an adsorber system having a bed of adsorbent divided into a plurality of sections and contained within a vessel, an apparatus for regenerating the adsorbent comprising:
    a carriage assembly movably disposed within said vessel;
    a microwave heating device mounted to said carriage assembly; and
    means for selectively positioning said carriage assembly adjacent to any one of the plurality of sections.

15. The apparatus of claim 14 wherein said carriage assembly further comprises means for isolating the section adjacent to said carriage assembly from the process stream.

16. The apparatus of claim 15 further comprising means for activating and deactivating said means for isolating.

17. The apparatus of claim 15 further comprising means for passing a purge gas through the section adjacent to said carriage assembly.

18. The apparatus of claim 14 further comprising at least one other carriage assembly movably disposed within said vessel.

* * * * *